(12) United States Patent
Samo

(10) Patent No.: US 11,838,462 B2
(45) Date of Patent: Dec. 5, 2023

(54) INFORMATION PROCESSING APPARATUS DISPLAYS PLURALITY OF BUTTONS ON A SCREEN, AND ENABLE OR DISABLE REORDER FUNCTION ON A SCREEN TO AUTOMATICALLY REORDER THE PLURALITY OF BUTTONS, METHOD, AND NON-TRANSITORY STORAGE MEDIUM

(71) Applicant: CANON KABUSHIKI KAISHA, Tokyo (JP)

(72) Inventor: Kazuki Samo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 17/580,254

(22) Filed: Jan. 20, 2022

(65) Prior Publication Data
US 2022/0239791 A1    Jul. 28, 2022

(30) Foreign Application Priority Data
Jan. 27, 2021   (JP) ................................ 2021-011289

(51) Int. Cl.
*H04N 1/00* (2006.01)
*H04N 1/44* (2006.01)

(52) U.S. Cl.
CPC ....... *H04N 1/00514* (2013.01); *H04N 1/0097* (2013.01); *H04N 1/00405* (2013.01);
(Continued)

(58) Field of Classification Search
None
See application file for complete search history.

(56) References Cited

U.S. PATENT DOCUMENTS

| | | | |
|---|---|---|---|
| 8,437,052 B2 * | 5/2013 | Maeda | H04N 1/00496 358/1.15 |
| 2008/0221647 A1 | 9/2008 | Chamberland et al. | |

(Continued)

FOREIGN PATENT DOCUMENTS

| | | |
|---|---|---|
| JP | 2008236028 A | 10/2008 |
| JP | 2016117158 A | 6/2016 |

OTHER PUBLICATIONS

Zhang, H.F., et al., "In vivo imaging of subcutaneous structures using functional photoacoustic microscopy", Nature Protocols, Apr. 5, 2007, pp. 797-804, vol. 2, No. 4.

(Continued)

*Primary Examiner* — Haris Sabah
(74) *Attorney, Agent, or Firm* — Canon U.S.A., Inc. IP Division

(57) ABSTRACT

An information processing apparatus having a plurality of functions, includes a first display control unit configured to display, on a screen, a plurality of buttons each configured to execute a corresponding one of the plurality of functions, a reordering unit configured to automatically reorder the plurality of buttons, and a setting unit configured to set reordering of the plurality of buttons to enabled or disabled, the reordering being performed by the reordering unit, wherein, in a case where the setting unit makes a setting in which the reordering is enabled, the reordering unit performs the reordering of the plurality of buttons, and in a case where the setting unit makes a setting in which the reordering is disabled, the reordering unit does not perform the reordering of the plurality of buttons.

15 Claims, 14 Drawing Sheets

(52) U.S. Cl.
CPC ....... *H04N 1/4433* (2013.01); *H04N 1/00387* (2013.01); *H04N 2201/0094* (2013.01)

(56) References Cited

U.S. PATENT DOCUMENTS

| | | | |
|---|---|---|---|
| 2013/0169986 A1* | 7/2013 | Lee | H04N 1/00517 358/1.13 |
| 2016/0094737 A1* | 3/2016 | Sugiura | H04N 1/00501 358/1.15 |
| 2018/0107438 A1* | 4/2018 | Takeuchi | H04L 63/20 |
| 2020/0236233 A1* | 7/2020 | Fukuda | G06F 3/0482 |

OTHER PUBLICATIONS

Wang, L.V., "Tutorial on Photoacoustic Microscopy and Computed Tomography", IEEE Journal of Selected Topics in Quantum Electronics, Jan. 2008, pp. 171-179, vol. 14, No. 1.

* cited by examiner

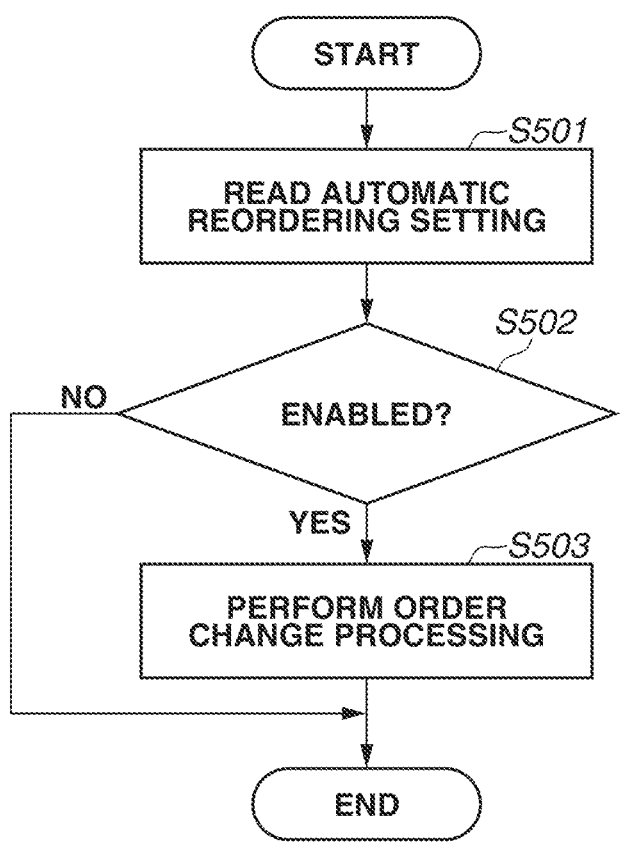

FIG.6

USER INFORMATION MANAGEMENT TABLE 600

| USER NAME | ORDER OF BUTTONS 602 | AUTOMATIC REORDERING SETTING 601 |
|---|---|---|
| USER A | COPY, SCAN AND SEND, FAX, PRINT ALL, SEND TO MYSELF | DISABLED |
| USER B | COPY, FAX, SEND TO MYSELF, SCAN AND SEND, PRINT ALL | ENABLED |
| USER C | FAX, PRINT ALL, COPY, SCAN AND SEND, SEND TO MYSELF | DISABLED |
| USER D | SEND TO MYSELF, COPY, SCAN AND SEND, FAX, PRINT ALL | DISABLED |
| ⋮ | ⋮ | ⋮ |

OPERATION HISTORY TABLE (USER B) 610

| OPERATION HISTORY SERIAL ID | EXECUTED BUTTON | EXECUTION DATE AND TIME | AUTOMATIC REORDERING SETTING WHEN EXECUTED 611 |
|---|---|---|---|
| 1 | B5 | 2020/1/1 0:00 | DISABLED |
| 2 | B3 | 2020/1/2 0:00 | DISABLED |
| 3 | B1 | 2020/1/3 0:00 | DISABLED |
| 4 | B4 | 2020/1/4 0:00 | ENABLED |
| ⋮ | ⋮ | ⋮ | ⋮ |

BUTTON TABLE 620

| BUTTON ID 621 | BUTTON NAME 622 | CALLED FUNCTION 623 | SETTING VALUE 624 |
|---|---|---|---|
| B1 | COPY | COPY | |
| B2 | SCAN AND SEND | SEND | |
| B3 | FAX | FAX | |
| B4 | PRINT ALL | PRINT | all |
| B5 | SEND TO MYSELF | SEND | aaaa@bb.cc |
| B6 | SIMPLE COPY | COPY | ONE-SIDED, COLOR AUTO |
| ⋮ | ⋮ | ⋮ | ⋮ |

ORDER HISTORY TABLE (USER B) 630

| HISTORY | ORDER OF BUTTONS |
|---|---|
| WHEN AUTOMATIC REORDERING IS DISABLED LAST TIME | FAX, COPY, SEND TO MYSELF, SCAN AND SEND, PRINT ALL |
| WHEN AUTOMATIC REORDERING IS ENABLED LAST TIME | COPY, SEND TO MYSELF, FAX, SCAN AND SEND, PRINT ALL |
| LAST ORDER | FAX, COPY, SEND TO MYSELF, SCAN AND SEND, PRINT ALL |
| ⋮ | ⋮ |

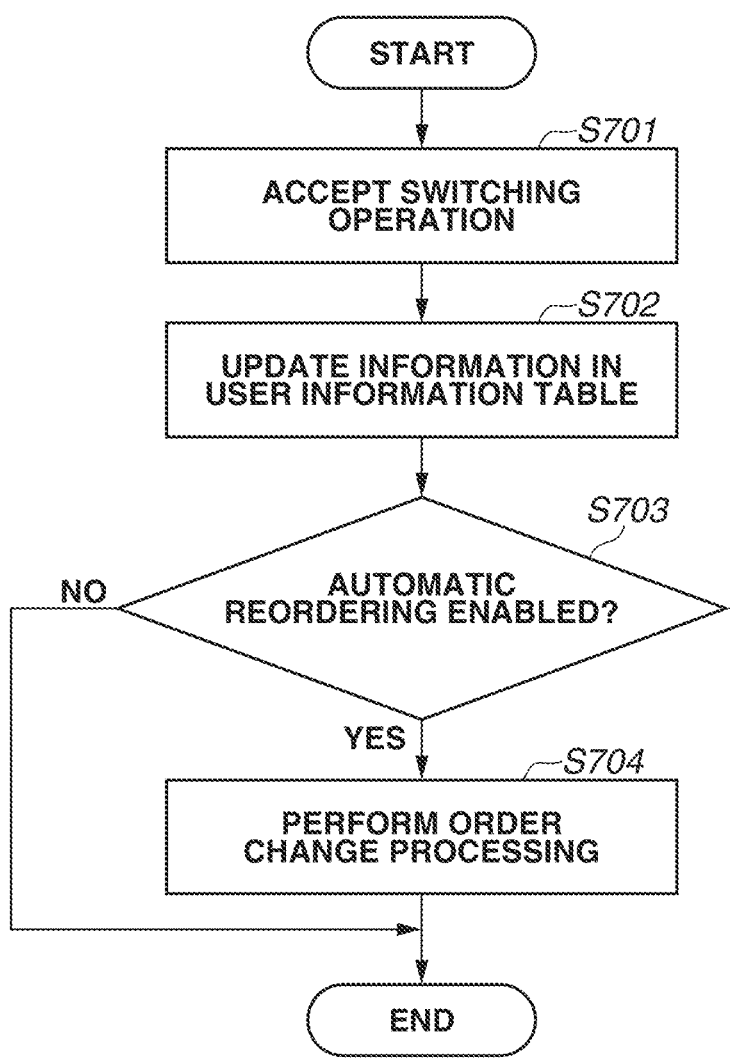

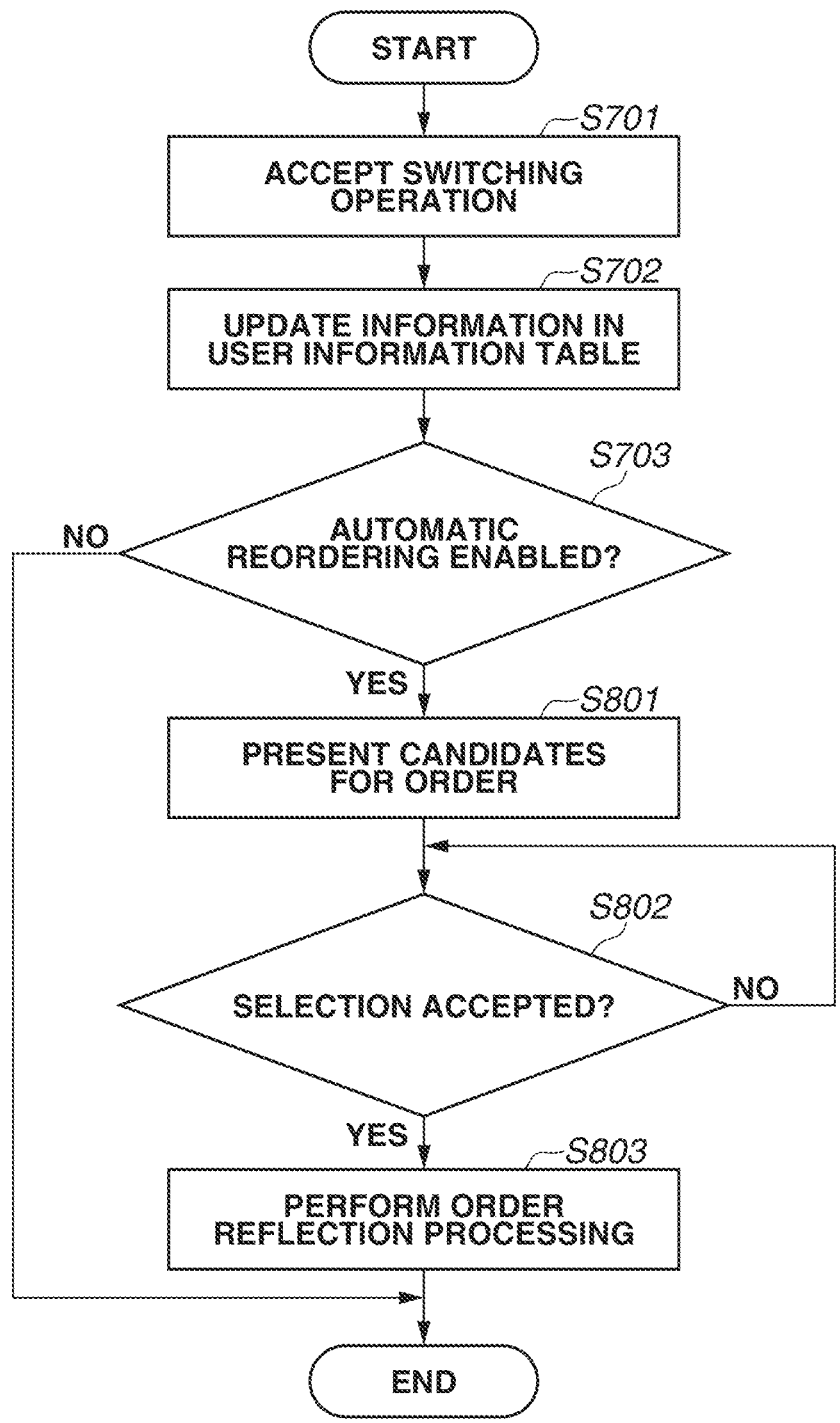

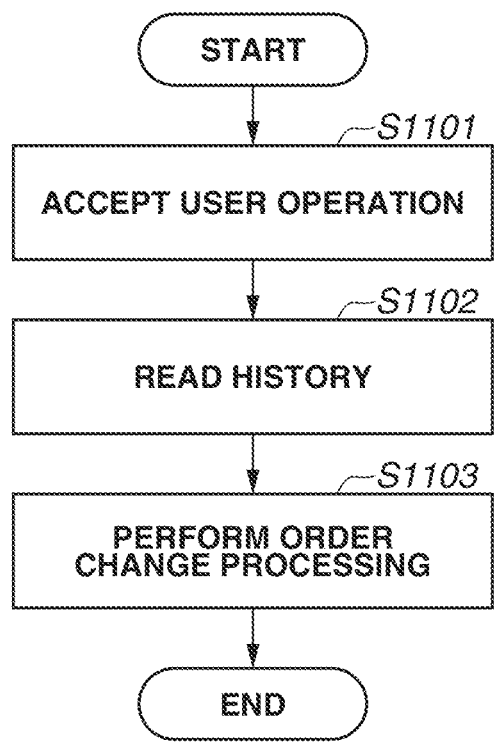

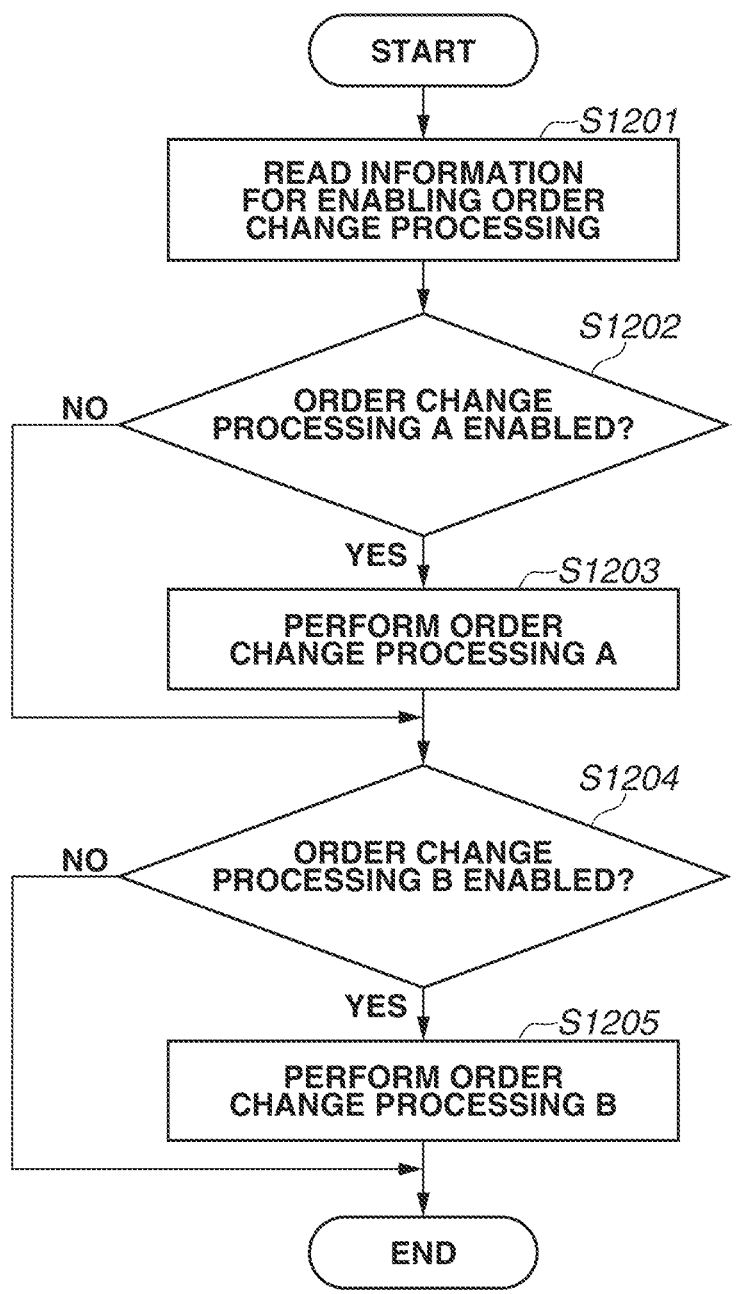

FIG.13

USER INFORMATION MANAGEMENT TABLE 1300

| USER NAME | ORDER OF BUTTONS | ORDER CHANGE PROCESSING A | ORDER CHANGE PROCESSING B |
|---|---|---|---|
| USER A | COPY, SCAN AND SEND, FAX, PRINT ALL, SEND TO MYSELF | DISABLED | ENABLED |
| USER B | COPY, FAX, SEND TO MYSELF, SCAN AND SEND, PRINT ALL | ENABLED | ENABLED |
| USER C | FAX, PRINT ALL, COPY, SCAN AND SEND, SEND TO MYSELF | DISABLED | DISABLED |
| USER D | SEND TO MYSELF, COPY, SCAN AND SEND, FAX, PRINT ALL | DISABLED | DISABLED |
| ... | ... | ... | ... |

(columns "ORDER CHANGE PROCESSING A" and "ORDER CHANGE PROCESSING B" grouped as 1301)

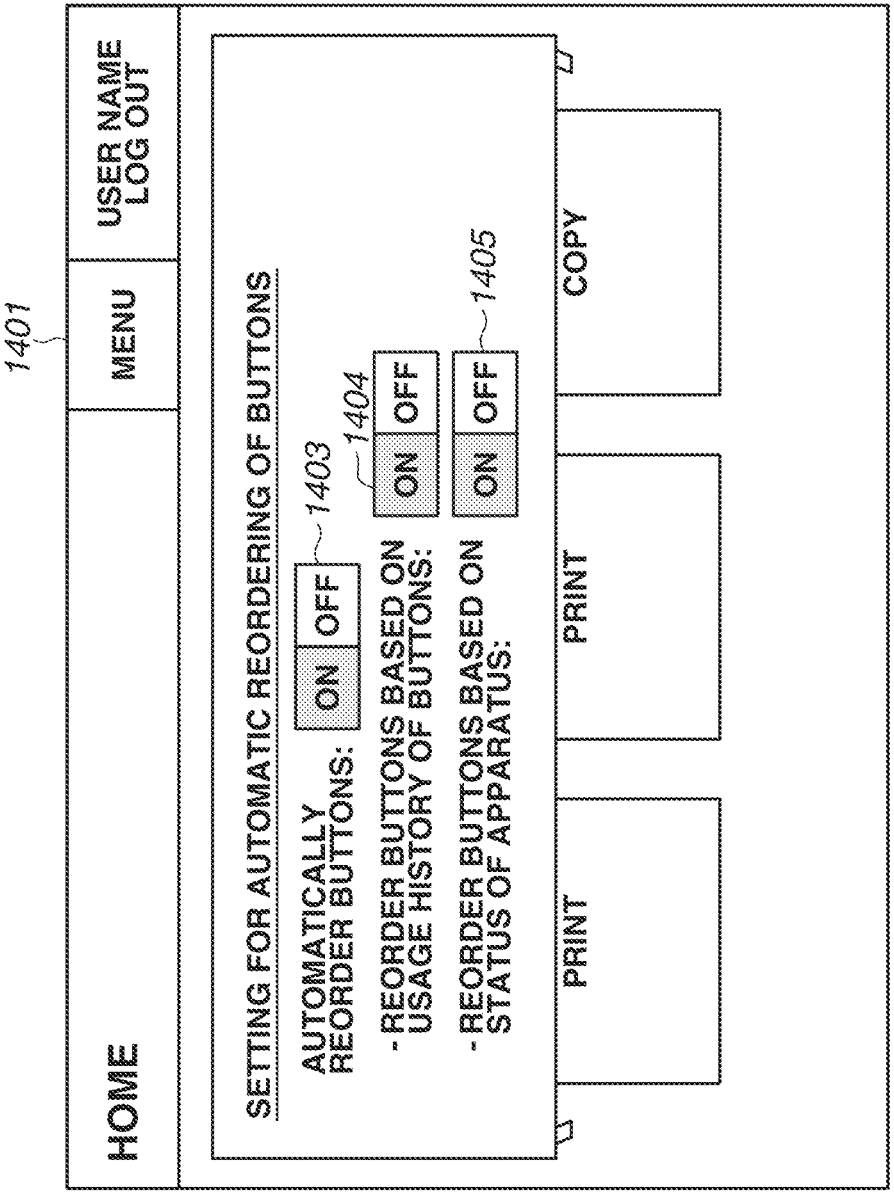

INFORMATION PROCESSING APPARATUS DISPLAYS PLURALITY OF BUTTONS ON A SCREEN, AND ENABLE OR DISABLE REORDER FUNCTION ON A SCREEN TO AUTOMATICALLY REORDER THE PLURALITY OF BUTTONS, METHOD, AND NON-TRANSITORY STORAGE MEDIUM

BACKGROUND

Field of the Disclosure

The present disclosure relates to an information processing apparatus, a method for the information processing apparatus, and a storage medium.

Description of the Related Art

An image processing apparatus displays, on an operation unit, a menu screen including a plurality of buttons for executing functions of the apparatus, such as a copy function and a scan function. A user can issue an instruction on a setting change or execution of a function by pressing a corresponding button among the above-mentioned buttons on the menu screen. With an increase in the number of functions of the image processing apparatus, the number of buttons displayed on the menu screen has also increased.

Japanese Patent Application Laid-Open No. 2016-117158 discusses a technique of reordering buttons displayed on the menu screen depending on a status of the image processing apparatus to make it easier for the user to find a desired button on the menu screen. For example, in a case where a document of a specific paper size is placed on a scanner of the image processing apparatus, the image processing apparatus reorders the buttons so that buttons related to processing to be performed on the document are displayed first on the menu screen. Meanwhile, Japanese Patent Application Laid-Open No. 2008-236028 discusses a method of preferentially displaying a button that may be desired by the user based on the user's usage history of buttons.

In this manner, preferentially displaying a button that may be desired by the user makes it easier for the user to find the desired button among a large number of buttons.

As described above, automatically reordering buttons based on the user's usage history or the like makes it easier for the user to find the desired button. However, depending on a user or a usage environment of the apparatus, there is a possibility that reordering the buttons makes the user feel rather bothersome. For example, in a case where the user utilizes the image processing apparatus with order of the buttons stored, if the buttons are reordered based on the usage history or the like, the user gets confused by display of the buttons in order different from the stored order. More specifically, automatically reordering the buttons may increase convenience in some cases, but may rather decrease the convenience in other cases. No consideration has been conventionally given to such an issue.

SUMMARY

Exemplary embodiments of the present disclosure are directed to providing a method of increasing convenience in an apparatus that automatically reorders buttons.

According to embodiments of the present disclosure, an information processing apparatus having a plurality of functions, includes at least one processor and at least a memory coupled to the at least one processor and having instructions stored thereon, the at least one processor, when the instructions are executed by the at least one processor, acting as: a first display control unit configured to display, on a screen, a plurality of buttons each configured to execute a corresponding one of the plurality of functions, a reordering unit configured to automatically reorder the plurality of buttons, and a setting unit configured to set reordering of the plurality of buttons to enabled or disabled, the reordering being performed by the reordering unit, wherein, in a case where the setting unit makes a setting in which the reordering is enabled, the reordering unit performs the reordering of the plurality of buttons, and in a case where the setting unit makes a setting in which the reordering is disabled, the reordering unit does not perform the reordering of the plurality of buttons.

Further features of the present disclosure will become apparent from the following description of exemplary embodiments with reference to the attached drawings.

BRIEF DESCRIPTION OF THE DRAWINGS

FIG. 5 is a flowchart illustrating order update processing according to the present exemplary embodiment of the present disclosure.

FIG. 6 is a diagram illustrating an example of a user information table according to the present exemplary embodiment of the present disclosure.

FIG. 7 is a flowchart illustrating processing performed when a switching button is pressed according to the present exemplary embodiment of the present disclosure.

FIG. 8 is a flowchart illustrating processing performed when a switching button is pressed according to a second exemplary embodiment of the present disclosure.

FIG. 11 is a flowchart illustrating processing according to the third exemplary embodiment of the present disclosure.

FIG. 12 is a flowchart illustrating order update processing according to a fourth exemplary embodiment of the present disclosure.

FIG. 13 is a diagram illustrating an example of a user information table according to the fourth exemplary embodiment of the present disclosure.

FIG. 14 is a diagram illustrating an example of a setting screen according to the fourth exemplary embodiment of the present disclosure.

DESCRIPTION OF THE EMBODIMENTS

Exemplary embodiments of the present disclosure will be described in detail below with reference to the accompanying drawings. In the exemplary embodiments, a description will be given of an image processing apparatus as an example of an information processing apparatus, but the present disclosure is not limited thereto. Further, not all combinations of features described in the exemplary embodiments are necessarily essential to a solving means of the present disclosure.

Figure 1:
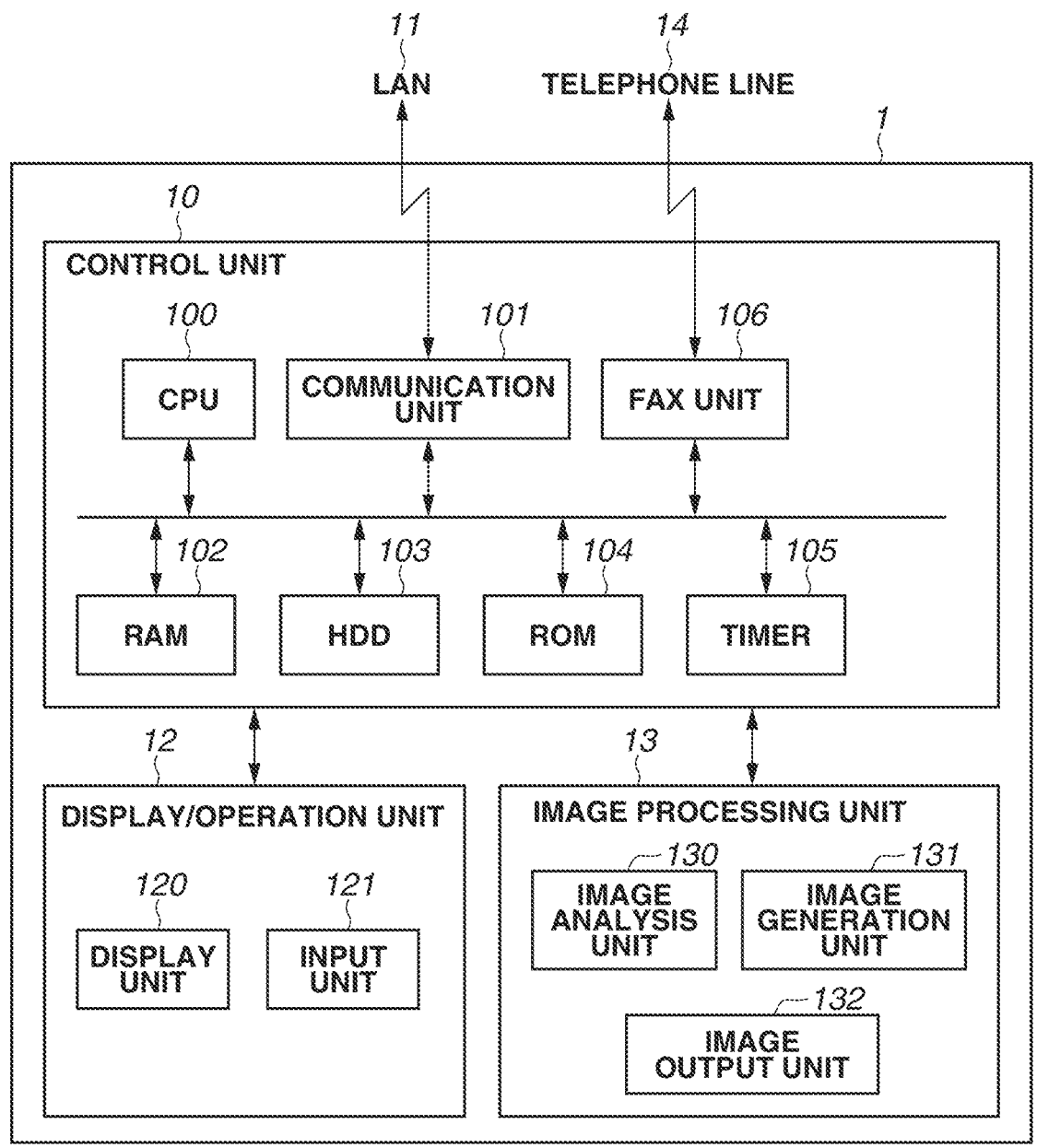
FIG. 1 is a diagram illustrating a hardware configuration of an image processing apparatus according to an exemplary embodiment of the present disclosure.

FIG. 1 is a block diagram illustrating a hardware configuration of an image processing apparatus 1 according to a first exemplary embodiment of the present disclosure.

A control unit 10 controls operation of each unit of the image processing apparatus 1. The control unit 10 includes a central processing unit (CPU) 100, a communication unit 101, a random-access memory (RAM) 102, a hard disk drive (HDD) 103, a read-only memory (ROM) 104, a timer 105, and a fax unit 106.

The CPU 100 controls the whole of the control unit 10. The communication unit 101 transmits and receives data via a local area network (LAN) 11. The LAN 11 represents a network for exchanging data with an external device, and the image processing apparatus 1 is connected to the Internet via the LAN 11.

The RAM 102 provides a system work memory for the CPU 100 to operate. The HDD 103 is a hard disk drive, but may be another storage device such as a magnetic disk, an optical medium, or a flash memory, or a combination of these devices. The HDD 103 can store job data, setting data, and the like. The HDD 103 may not be included in the image processing apparatus 1. For example, an external server, a personal computer, or the like may be utilized as a storage device via the communication unit 101.

The ROM 104 is a boot ROM, and stores a boot program of a system. The CPU 100 loads a program installed in the HDD 103 to the RAM 102 using the boot ROM of the ROM 104, and performs various kinds of control based on the program.

The timer 105 measures time in according to an instruction from the CPU 100, and notifies the CPU 100 of the time by an interruption when an instructed time has elapsed. The fax unit 106 transmits and receives fax data via a telephone line 14.

A display/operation unit 12 is controlled by the control unit 10, and includes a display unit 120 and an input unit 121. The display unit 120 is a display for displaying information about the image processing apparatus 1 to a user. The input unit 121 accepts input from the user via an interface such as a touch panel, a mouse, a camera, voice input, and a keyboard. Alternatively, the input unit 121 may be a non-contact user interface via which the user can perform an input operation without touching the operation unit.

An image processing unit 13 is controlled by the control unit 10, and includes an image analysis unit 130, an image generation unit 131, and an image output unit 132.

The image analysis unit 130 analyzes a structure of an original image, and extracts necessary information from a result of analysis.

The image generation unit 131 reads (for example, scans) a document, digitizes an image of the document to generate image data, and stores the image data in the HDD 103. In addition, the image generation unit 131 can also generate original image data in another format using the information obtained as the result of analysis by the image analysis unit 130.

The image output unit 132 outputs image data stored in the HDD 103 or the like. Examples of an output method include a method of printing image data of a document on paper, a method of transmitting the image data to an external device, a server, or a facsimile device that is connected to a network via the communication unit 101, and a method of storing the image data in a storage medium connected to the image processing apparatus 1.

Figure 2:
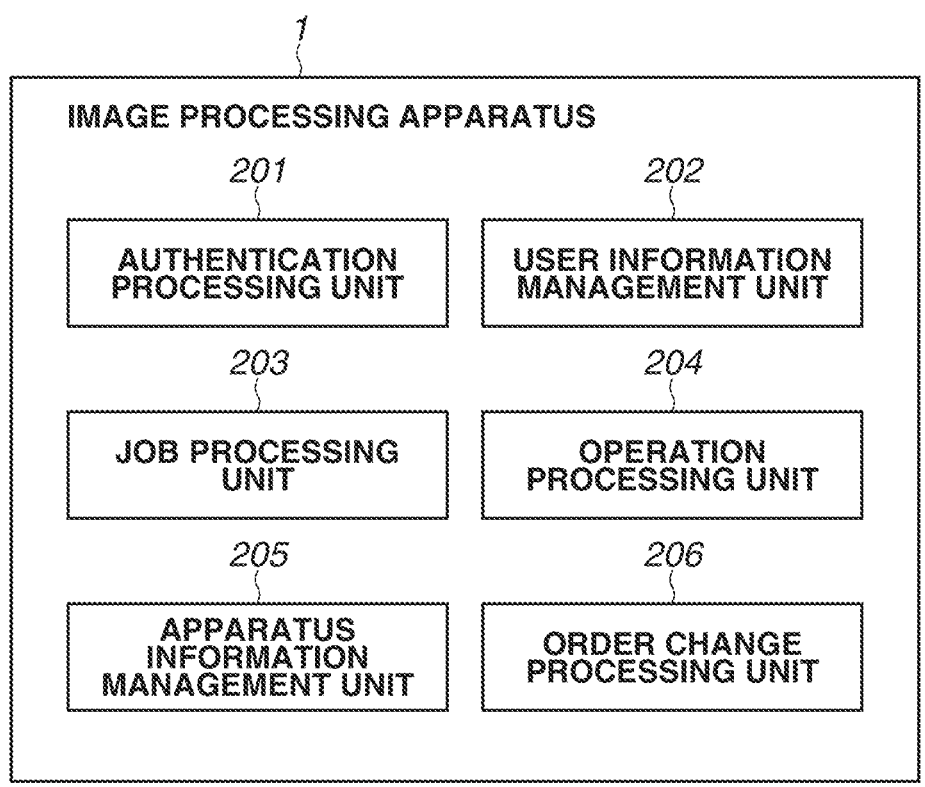
FIG. 2 is a diagram illustrating a software configuration of the image processing apparatus according to the present exemplary embodiment of the present disclosure.

FIG. 2 is a diagram illustrating an example of a software configuration of functions of the image processing apparatus 1.

The image processing apparatus 1 includes, as functional modules thereof, an authentication processing unit 201, a user information management unit 202, a job processing unit 203, an operation processing unit 204, an apparatus information management unit 205, and an order change processing unit 206. Each of the functional units is implemented by the CPU 100 loading a program installed in the HDD 103 to the RAM 102 using the boot ROM of the ROM 104 and executing the program.

The authentication processing unit 201 executes log-in and log-out processing by accepting input from the user. When accepting input of a user identification (ID) and a password from the user, the authentication processing unit 201 performs authentication based on the accepted information. In a case where the authentication has succeeded, the authentication processing unit 201 performs processing preliminarily associated with the authenticated user.

The user information management unit 202 manages information regarding the user authenticated by the authentication processing unit 201 on a user-by-user basis. For example, the user information management unit 202 manages a language (e.g., English, Japanese, etc.) used when the image processing apparatus 1 is used, and can thereby switch the language on the user-by-user basis. The user information management unit 202 can also manage print jobs received from an external device via the communication unit 101 for each user who has input a job. The user information management unit 202 can also manage information regarding order of buttons displayed on a menu screen (for example, the order of buttons 602) and/or information used for changing the order of the buttons (for example, information such as the user's usage history of the buttons) on the user-by-user basis. The user information management unit 202 also stores information regarding the order of the buttons of the user in the past. The menu screen mentioned herein is a portal screen in which a plurality of buttons for executing various kinds of functions including an image processing function of the image processing apparatus 1 is arranged, and the display order of the buttons can be automatically changed based on the user's usage history of the buttons. The user information management unit 202 also manages information regarding whether to automatically change the display order of the buttons displayed on the menu screen on the user-by-user basis. In other words, the user information management unit 202 manages a setting of whether to change the display order of the buttons based on the usage history of the buttons or the like on the user-by-user basis.

The job processing unit 203 performs processing of various kinds of jobs executed in the image processing apparatus 1. Specifically, the job processing unit 203 controls the image generation unit 131 to execute a scan job, controls the image output unit 132 to execute a print job, and controls the communication unit 101 to execute a transmission job.

The operation processing unit 204 controls the display unit 120 to control display of various kinds of information to the user. In addition, the operation processing unit 204 accepts an operation instruction input by the user from the input unit 121 and performs processing.

The apparatus information management unit 205 manages information regarding the whole of the image processing apparatus 1. Specific examples of the information managed by the apparatus information management unit 205 include an Internet Protocol (IP) address allocated to the apparatus and a setting value common to all users who utilize the apparatus. The apparatus information management unit 205 can manage information of a similar type to that of information managed by the user information management unit 202.

The order change processing unit 206 performs processing for changing the order of the buttons displayed on the menu screen. For example, the order change processing unit 206 determines a display priority level of each of the buttons based on the user's usage history of the buttons (for example, the buttons are displayed so that a button frequently used is placed at the top). A method of determining the display priority level of each of the buttons is not limited thereto, and a plurality of methods may be used. The display priority level of each of the buttons may be determined based on, for example, a status of the image processing apparatus 1 (for example, a button for performing scan processing is preferentially displayed in a status where paper is placed on a scanner of the image processing apparatus 1). The following description will be given of a case in which the display order of the buttons is determined based on the usage history of the buttons as an example, but a method of determining the order of the buttons is not limited thereto. The order of the buttons may be determined based on the status as described above, or may be determined in consideration of the status of the image processing apparatus 1 and the usage history of the buttons.

The image processing apparatus 1 may be configured not to include the authentication processing unit 201 and the user information management unit 202. In such a case, however, the apparatus information management unit 205 performs processing equivalent to that performed by the user information management unit 202, and handles all users as one user without any distinction.

Figure 3:
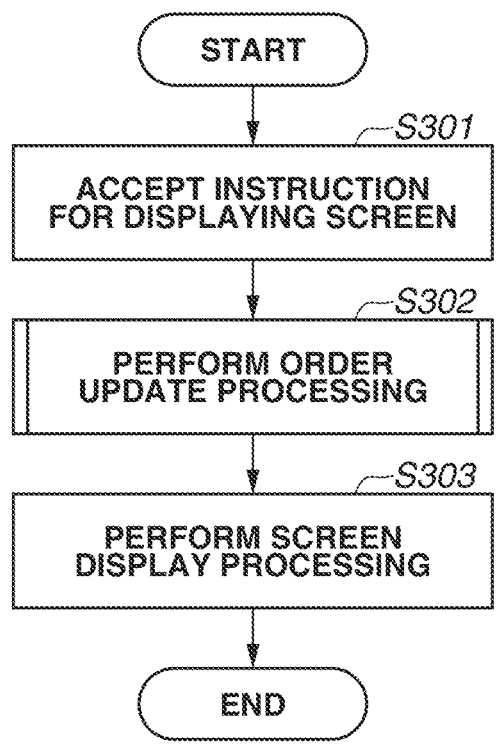
FIG. 3 is a flowchart illustrating screen display processing according to the present exemplary embodiment of the present disclosure.

FIG. 3 is a flowchart illustrating processing of displaying the menu screen. Each step in FIG. 3 is implemented by the CPU 100 of the image processing apparatus 1 executing a program. The program to be executed is read from the ROM 104 and then executed.

In step S301, the operation processing unit 204 accepts a display instruction for displaying the menu screen from the user.

Examples of the display instruction mentioned herein include detection of the presence of the user in front of the image processing apparatus 1, the user's operation of the display/operation unit 12, and execution of user authentication. When the operation processing unit 204 accepts the display instruction for displaying the menu screen, the processing proceeds to step S302.

In step S302, the order change processing unit 206 performs processing of updating the order of the buttons displayed on the menu screen (details of the processing will be described below with reference to FIG. 5). After the processing of updating the order of the buttons is performed, the processing proceeds to step S303.

Figure 4A:
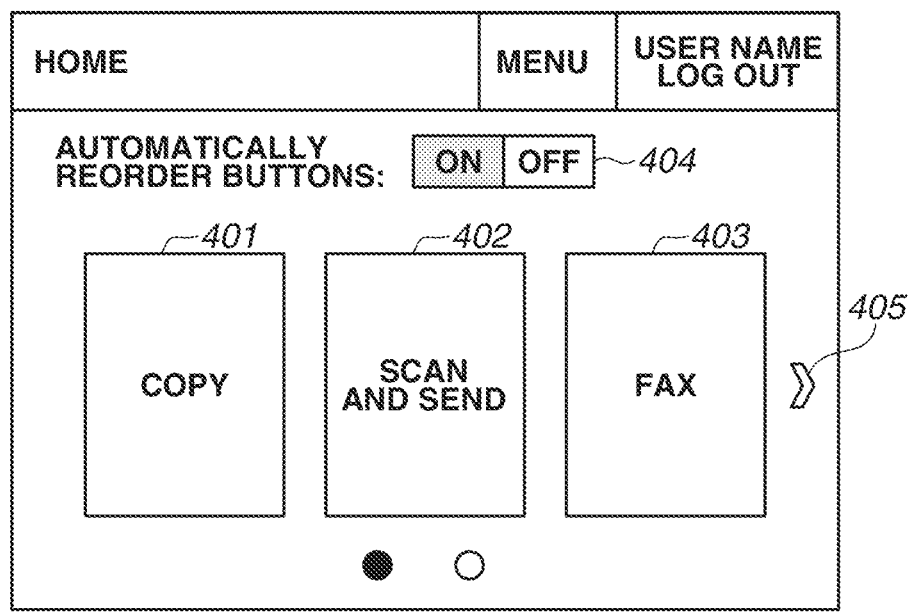
FIGS. 4A and 4B are diagrams each illustrating an example of a menu screen according to the present exemplary embodiment of the present disclosure.
Figure 4B:
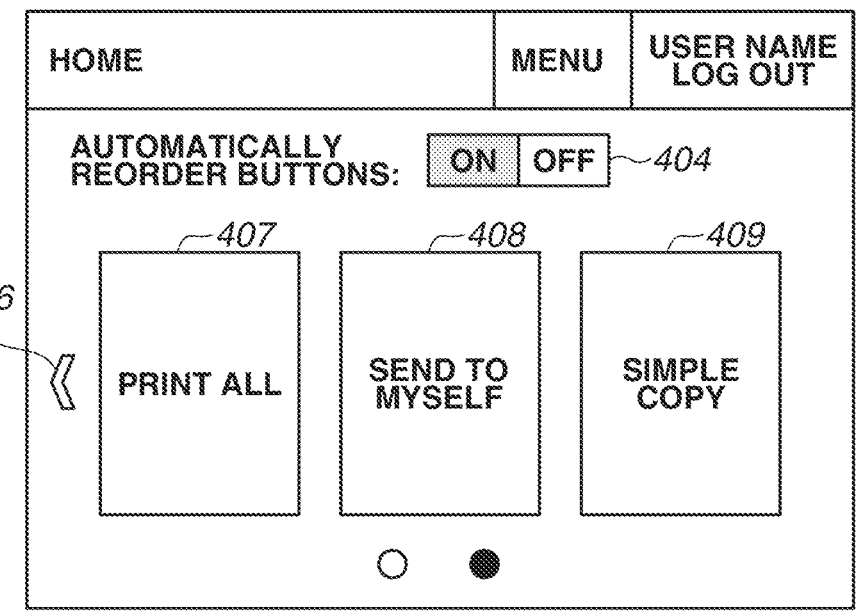

In step S303, the operation processing unit 204 displays the menu screen in the order of the buttons changed in step S302. Examples of the menu screen to be displayed are illustrated in FIGS. 4A and 4B. FIG. 4A illustrates a first page of the menu screen, and FIG. 4B illustrates a second page of the menu screen. The buttons are displayed so that buttons frequently used by the user are placed at the top.

When the user presses a page forward button 405, buttons at the bottom are displayed. When the user presses a page back button 406, buttons at the top are displayed. In the first exemplary embodiment, a display priority level is higher toward the left. The page forward button 405 is not displayed in a case where there is no button at the bottom, and the page back button 406 is not displayed in a case where there is no button at the top. Function buttons 401 to 403 and 407 to 409 are buttons for executing processing using respective functions of the image processing apparatus 1, and display of a setting screen or execution of processing can be performed by pressing a corresponding function button.

As illustrated in a button table 620 in FIG. 6, information about the buttons displayed on the menu screen is managed by the apparatus information management unit 205. In a button ID 621 column, identifiers for uniquely identifying the respective buttons are defined. In a button name 622 column, button names are defined.

In a call function 623 column, functions executed when the respective buttons are selected by the user are defined. In a setting value 624 column, setting values to be added as parameters when the respective functions are executed are defined. The buttons defined by the button table 620 are displayed in predetermined order on the menu screen composed of a plurality of pages. Not all of the buttons defined by the button table 620 are necessarily displayed on the menu screen. There may be a button that is stored as button information but is not displayed on the menu screen.

When the user presses a switching button 404, whether to enable or disable automatic reordering of the buttons by the system can be switched. In other words, whether to change the order of the buttons can be switched based on the user's usage history of the buttons. A setting of enabling/disabling the automatic reordering of the buttons is stored on the user-by-user basis as an automatic reordering setting.

FIG. 5 is a flowchart illustrating the order update processing (S302) performed by the system. Each processing in FIG. 5 is implemented by the CPU 100 of the image processing apparatus 1 executing a program. The program to be executed is read from the ROM 104 and then executed.

In step S501, the order change processing unit 206 reads an automatic reordering setting 601 of a log-in user of the image processing apparatus 1 from a user information management table 600 (FIG. 6) managed by the user information management unit 202, and the processing proceeds to step S502. Whether to enable or disable the automatic reordering setting 601 is switched, for example, by an operation of the switching button 404. The user information management unit 202 stores the order of buttons 602 indicating the display order of the buttons on the menu screen and the automatic reordering setting 601 in association with each other on the user-by-user basis, as illustrated in the user information management table 600. The buttons are displayed on the menu screen based on the display order indicated by the order of buttons 602. For example, in the case of a user A, use frequency of the buttons is in descending order of a copy button, a scan and send button, a fax button, a print all button, and a send to myself button, and the buttons are displayed on the menu screen in this order.

In step S502, the order change processing unit 206 determines whether the automatic reordering setting 601 read in step S501 is "enabled". In a case where the automatic reordering setting 601 is "enabled" (YES in step S502), the processing proceeds to step S503. In a case where the automatic reordering setting 601 is "disabled" (NO in step S502), the order update processing ends.

In step S503, the order change processing unit 206 performs processing of changing the order of the buttons displayed on the menu screen.

Specifically, the order change processing unit 206 updates the order of buttons 602 for the log-in user of the image processing apparatus 1 based on the usage history of the buttons held by the user information management unit 202.

More detailed description will be given with reference to an operation history table 610. The operation history table 610 is a table indicating the number of uses of buttons on the user-by-user basis, and the operation history table for a user B is illustrated in FIG. 6. Each row indicates one job execution, and an identifier of an executed button and execution date and time are stored in association with each other. The order change processing unit 206 counts the number of executions of each job, i.e., the number of uses of each button, and updates the order of buttons 602 so that a button whose number of uses is large is displayed at the top. More specifically, if jobs are executed on the image processing apparatus 1 many times, the buttons are automatically reordered so that a button whose number of uses is large is displayed at the top. The update processing in step S503 is not necessarily performed at this timing, and may be performed every time the user uses a button on the menu screen. For a user who has never executed a job before on the image processing apparatus 1, the menu screen is displayed in default order (for example, a factory default setting). In a case where the user disables the automatic reordering and utilizes the image processing apparatus 1, the buttons continue to be displayed in the default order at all times.

With the processing according to the flowchart, a user who enables the automatic reordering setting does not have to go through the trouble of searching for a desired button because a button whose number of uses is large is preferentially displayed on the menu screen. On the other hand, in a case where the automatic reordering setting is disabled, the order of the buttons is fixed regardless of the usage history of the buttons, which is convenient for a user who memorizes display positions of the buttons and selects a button. In this manner, the user can change whether to change the display order of the buttons based on an operation history. A method of performing the processing for changing the order of the buttons is not limited to the method based on the usage history of the buttons, and may be a method of updating the order of buttons 602 based on a status of the apparatus (for example, status information such as whether a document is placed on the scanner) held by the apparatus information management unit 205.

FIG. 7 is a flowchart illustrating details of processing performed when the user's operation of the switching button 404 is accepted. Each step in FIG. 7 is implemented by the CPU 100 of the image processing apparatus 1 executing a program. The program to be executed is read from the ROM 104 and then executed.

In step S701, the operation processing unit 204 accepts the user's operation of switching whether to enable or disable the automatic reordering of the buttons displayed on the menu screen. The switching operation mentioned herein may be an operation of the switching button 404, or may be accepted on a setting screen different from the menu screen, a dialog, or the like. In a case where the operation processing unit 204 accepts the user's operation, the processing proceeds to step S702.

In step S702, as a result of the switching operation accepted in step S701, the operation processing unit 204 records the automatic reordering setting in the user information management table 600, and the processing proceeds to step S703.

In step S703, the operation processing unit 204 determines whether the user's operation accepted in step S701 is to enable the automatic reordering. In a case where the user's operation is to disable the automatic ordering (NO in step S703), the processing ends. In a case where the user's operation is to enable the automatic ordering (YES in step S703), the processing proceeds to step S704.

In a case where the user disables the automatic reordering, the operation processing unit 204 may be configured to not perform subsequent recording of the number of uses of the buttons using the operation history table 610. This can save a storage capacity of the image processing apparatus 1.

In step S704, the order change processing unit 206 performs processing of changing the order of the buttons when the automatic reordering is set to enabled. In the order change processing in step S704, the order change processing unit 206 changes the order of the buttons displayed on the menu screen based on the usage history of the buttons held by the user information management unit 202. Specifically, the order change processing unit 206 counts the number of uses of each button with reference to the operation history table 610, and changes the order of the buttons so that a button whose number of uses is large is displayed at the top. As the operation history to be referred to herein, the order change processing unit 206 may refer to all usage histories up to when the automatic reordering is enabled this time, or may refer to only usage histories before when the automatic reordering is disabled the last time. By referring to the usage histories before when the automatic reordering is disabled the last time, the order change processing unit 206 can restore the order of the buttons when the automatic reordering is disabled the last time. In this case, as indicated in an automatic reordering setting when executed 611 in the operation history table 610, the user information management unit 202 stores the usage history of the buttons and enable/disable information in the automatic reordering setting in association with each other.

For example, in a case where the user whose frequently used button in routine work is fixed enables the automatic reordering and utilizes the menu screen on which the frequently used button is preferentially displayed, if work different from the routine work is assigned to the user only in a certain month and the user's frequently used button is changed, a display priority level of the frequently used button in the routine work decreases. Consequently, the frequently used button is not preferentially displayed when the routine work is resumed, which is troublesome for the user. In consideration of such a case, the automatic reordering is disabled only in the certain month in which work different from the routine work is performed so that the order of the buttons is not changed, the automatic reordering is enabled when the routine work is resumed, and the user can thereby utilize the menu screen on which the button frequently used in the routine work is preferentially displayed. In a case where the automatic reordering is enabled, the order change processing unit 206 may apply the default order of the buttons held by the apparatus information management unit 205 without utilizing the operation history.

Performing the processing according to the flowcharts described above allows the user to switch whether to automatically change the order of the buttons at a desired timing. While the description has been given of the example in which the setting of whether to enable or disable the automatic reordering can be made on the user-by-user basis, the configuration is not limited thereto. The setting of whether to enable or disable the automatic reordering may be made as a common apparatus setting of the image processing apparatus 1.

In the first exemplary embodiment, the processing of changing the order of the buttons is performed when the automatic reordering is enabled. In a second exemplary embodiment, a description will be given of an example of presenting order of a plurality of patterns when performing the processing of changing the order of the buttons so that the user can select the user's desired order. A basic configuration of the second exemplary embodiment is the same as that of the first exemplary embodiment, and thus only a difference will be described.

The difference of the present exemplary embodiment from the first exemplary embodiment is that the flowchart illustrated in FIG. 7 is changed to a flowchart illustrated in FIG. 8.

FIG. 8 is a flowchart illustrating details of processing performed when the user's operation of switching whether to enable or disable the automatic reordering is accepted. Each step in FIG. 8 is implemented by the CPU 100 of the image processing apparatus 1 executing a program. The program to be executed is read from the ROM 104 and then executed. A difference from FIG. 7 is that step S704 is changed to steps S801 to S803.

Figure 9:
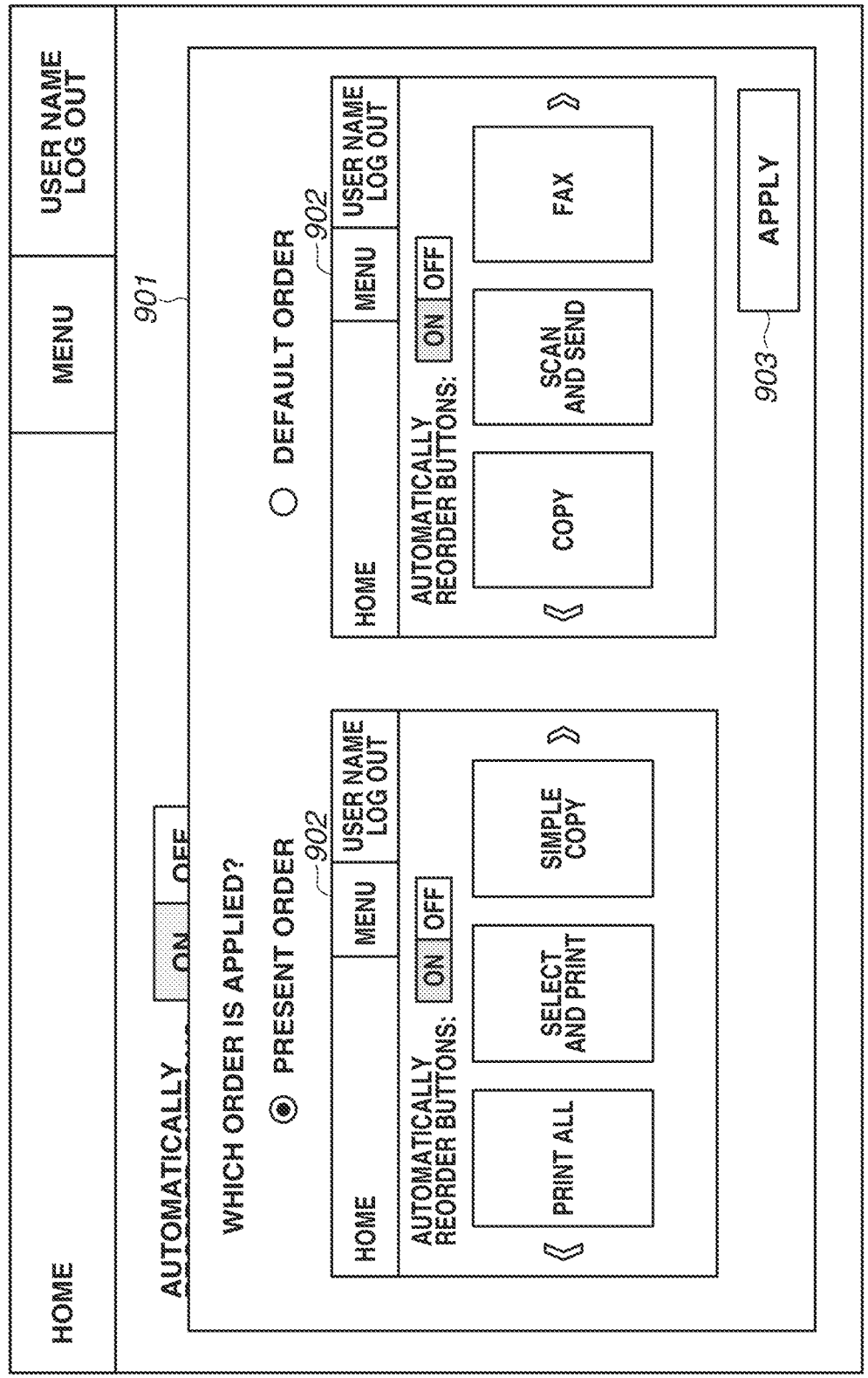
FIG. 9 is a diagram illustrating an example of a screen on which a user can select order of buttons according to the second exemplary embodiment of the present disclosure.

In step S801, in a case where the user's operation accepted in step S701 is an operation of enabling the automatic reordering, the operation processing unit 204 presents a plurality of candidates for the order of the buttons to the user. FIG. 9 illustrates an example of a screen on which the candidates for the order of the buttons are presented. Two candidates 902 for the order of the buttons are displayed in a dialog 901.

An order history table 630 illustrated in FIG. 6 is used to describe the order of the buttons to be presented in step S801. The order history table 630 is a table for storing the user's order of the buttons in the past. As one example, the order of the buttons used when the user has disabled the automatic reordering of the buttons the last time, the order of the buttons used when the user has enabled the automatic reordering of the buttons the last time, and the like are stored in the order history table 630. Every time the automatic reordering is enabled or disabled, the order of the buttons displayed on the menu screen at that time is stored in the order history table 630.

Examples of the candidates for the order of the buttons to be presented include the default order held by the apparatus information management unit 205, the order of the buttons based on the number of uses of all the buttons up to when the automatic reordering is enabled this time, and the order of the buttons used when the automatic reordering is disabled or enabled the last time. Besides the above, examples of the candidates for the order of the buttons to be presented include the order preset by the user, and the order set by an administrator of the image processing apparatus 1. Among the candidates, at least two candidates are displayed on the display unit 120 in a state where the user can make comparison between the at least two candidates, and the processing proceeds to step S802. Alternatively, the user may be able to preset which candidates for the order are to be presented.

In step S802, the operation processing unit 204 determines whether it has accepted the user's operation of selecting a candidate for the order displayed on the display unit 120 in step S801. Specifically, the operation processing unit 204 detects whether an apply button 903 is pressed. In a case where the operation processing unit 204 accepts the user's operation for selection (YES in step S802), the processing proceeds to step S803. In a case where the operation processing unit 204 does not accept the user's operation for selection (NO in step S802), the processing in step S802 is repeated.

In step S803, the operation processing unit 204 reflects the candidate for the order selected by the user in step S802 in the order of the buttons displayed on the menu screen. Usage histories other than a usage history of buttons corresponding to the selected candidate for the order may be deleted. For example, in a case where the default order is selected, all of the previous usage histories may be deleted and the number of uses may be newly counted.

Performing the above-mentioned processing allows the user to select the order of the buttons that is close to order intended by the user when the user enables the automatic reordering, and thereby increasing the user's convenience. While the description has been given of the example of presenting the candidates when the automatic reordering is enabled, the candidates may be presented also when the automatic reordering is disabled. This allows the user to select whether the order of the buttons is to be fixed to the present order of the buttons or the order of the buttons is to be changed to the default order and then fixed.

In a third exemplary embodiment, in a case where the reordering of the buttons is performed based on the number of uses of the buttons, a method of reinstating the original order before the reordering will be described. For example, in a case where the user continues to utilize the image processing apparatus 1 without disabling the automatic reordering in a state where the buttons are arranged in the order of the buttons desired by the user, it is possible to reinstate the desired order even if the number of uses of buttons that are not usually utilized increases due to unexpected work or the like and the desired order is changed. A basic configuration of the third exemplary embodiment is the same as that of the first exemplary embodiment, so that only a difference will be described.

Figure 10:
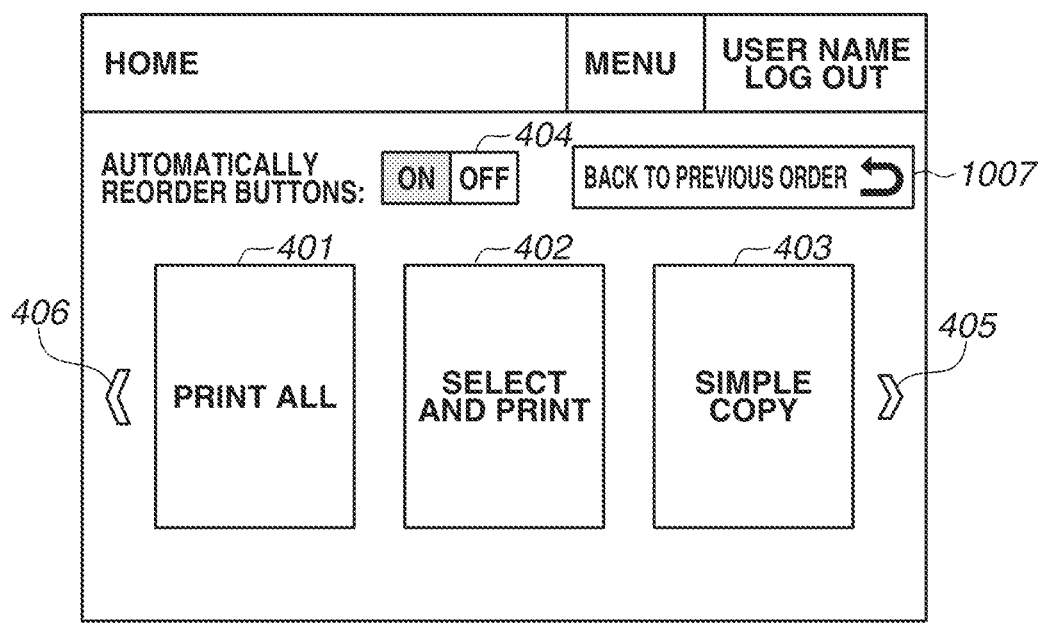
FIG. 10 is a diagram illustrating an example of a menu screen according to a third exemplary embodiment of the present disclosure.

FIG. 10 is a diagram illustrating an example of a menu screen according to the present exemplary embodiment. A difference from FIGS. 4A and 4B is that a reinstate button 1007 is displayed. Pressing the reinstate button 1007 can reinstate the order of the buttons before the reordering of the buttons.

Processing performed when the reinstate button 1007 is pressed will be described with reference to a flowchart illustrated in FIG. 11. Each step in FIG. 11 is implemented by the CPU 100 of the image processing apparatus 1 executing a program. The program to be executed is read from the ROM 104 and then executed.

In step S1101, the operation processing unit 204 accepts an operation on the reinstate button 1007 from the user, and the processing proceeds to step S1102.

In step S1102, the operation processing unit 204 reads an order change history held by the user information management unit 202. The order change history mentioned herein is information indicating the order of the buttons in the past. To store the history, in a case where the order of the buttons is changed in step S503 in the present exemplary embodiment, the user information management unit 202 is caused to hold information indicating the order of the buttons before the change. After the operation processing unit 204 reads the order change history, the processing proceeds to step S1103.

In step S1103, the order change processing unit 206 displays the buttons on the menu screen based on the order change history read in step S1102. In other words, the order of the buttons before the reordering is restored. At this time, a usage history of the buttons after the reordering performed the last time up to the reordering performed this time may be deleted.

Performing the above-mentioned processing allows the user to reinstate the original order of the buttons even in a case where the order becomes the one not desired by the user.

In the exemplary embodiments described above, the order of the buttons displayed on the menu screen is changed based on the usage history of the buttons on the menu screen. However, it is conceivable to use a factor other than the usage history of the buttons as a factor for changing the order of the buttons. An example of the factor may be the status of the apparatus. In a status where paper is placed on the scanner of the image processing apparatus 1, it is conceivable to reorder the buttons so that a button for performing scan processing is preferentially displayed. In a fourth exemplary embodiment, a description will be given of an example in which the apparatus that performs automatic reordering of the buttons based on a plurality of factors in this manner can set whether to enable the automatic reordering of the buttons for each factor. A basic configuration of the fourth exemplary embodiment is the same as that of the first exemplary embodiment, so that only a difference will be described.

FIG. 14 is a diagram illustrating an example of a setting screen 1401 regarding reordering of the buttons according to the present exemplary embodiment. A button 1403 for switching whether to automatically reorder the buttons on the menu screen, a button 1404 for switching whether to reorder the buttons using the usage history of the buttons, and a button 1405 for switching whether to reorder the buttons based on the status of the apparatus are displayed. More specifically, it is possible to set whether to reorder the buttons for each factor used for reordering the buttons. For example, if both the button 1404 for switching whether to reorder the buttons using the usage history of the buttons and the button 1405 for switching whether to reorder the buttons based on the status of the apparatus are enabled, the buttons on the menu screen are reordered based on both the usage history and the status of the apparatus. When one of the factors is disabled, the buttons are reordered based on the other of the factors. Factors used for performing the reordering are not limited to the two factors described above.

FIG. 12 is a flowchart illustrating the order update processing (S302) performed by the system. Each processing in FIG. 12 is implemented by the CPU 100 of the image processing apparatus 1 executing a program. The program to be executed is read from the ROM 104 and then executed. In the flowchart, a case is described where two factors of a factor A (the usage history of the buttons) and a factor B (the status of the image processing apparatus 1) are provided as the factors for reordering the buttons, and the image processing apparatus 1 performs order change processing A (reordering the buttons based on the usage history) and order change processing B (reordering the buttons based on the status of the image processing apparatus 1).

In step S1201, the order change processing unit 206 reads a setting regarding the reordering made on the setting screen 1401, and the processing proceeds to step S1202. The setting regarding the reordering made on the setting screen 1401 is managed in order change processing A/order change processing B 1301 of a user information management table 1300 illustrated in FIG. 13.

In step S1202, the order change processing unit 206 checks whether the order change processing A is enabled based on the information read in step S1201. In a case where the order change processing A is enabled (YES in step S1202), the processing proceeds to step S1203. In a case where the order change processing A is disabled (NO in step S1202), the processing proceeds to step S1204 and subsequent steps.

In step S1203, the order change processing unit 206 executes the order change processing A, and thereafter, the processing proceeds to step S1204.

In step S1204, the order change processing unit 206 checks whether the order change processing B is enabled based on the information read in step S1201. In a case where the order change processing B is enabled (YES in step S1204), the processing proceeds to step S1205. In a case where the order change processing B is disabled (NO in step S1204), the processing ends. In step S1205, the order change processing unit 206 executes the order change processing B, and thereafter, the processing ends. At this time, in a case where the processing in step S1203 has been executed, the order change processing unit 206 further applies the order change processing B to the order subjected to the order change processing A. Alternatively, the order change processing unit 206 determines the order of the buttons by taking into consideration both the factors of the order change processing A and the order change processing B.

Performing the above-mentioned processing enables provision of processing of changing the order of the buttons that is close to processing intended by the user, and thereby increasing the user's convenience.

In the first exemplary embodiment, the description has been given of the mode of displaying the function buttons 401 to 403, which are associated with the respective functions of the image processing apparatus 1, and the switching button 404 on the same screen as one example of the menu screen as illustrated in FIGS. 4A and 4B, but mode of displaying is not limited thereto. For example, as illustrated in FIG. 14, when a menu button or a similar button is pressed, switching buttons 1403 to 1405 are displayed on another screen or dialog, and the user's switching operation may be accepted on the other screen or dialog. Not only the switching button 404, but also the reinstate button 1007 may be similarly displayed on another screen or dialog different from the screen or dialog on which the function buttons 401 to 403 are displayed. The switching button 404 and the reinstate button 1007 may be displayed on the same screen or dialog, or may be displayed on different screens or dialogs.

In the above-mentioned exemplary embodiments, the description has been given of the example of reordering the buttons on the menu screen based on the number of uses of the buttons, but a configuration of preferentially displaying the buttons is not limited to the configuration of reordering the buttons. For example, a configuration of displaying a button that is frequently used in a magnified manner based on the number of uses of the button or a configuration of highlighting such a button may be employed. Alternatively, a configuration of displaying only buttons that are frequently used on the menu screen and not displaying the other buttons may be employed.

Embodiments of the present disclosure increase convenience in the apparatus that performs automatic reordering of the buttons.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-011289, filed Jan. 27, 2021, which is hereby incorporated by reference herein in its entirety.

What is claimed is:

1. An information processing apparatus having a plurality of functions, comprising:
at least one processor and at least a memory coupled to the at least one processor and having instructions stored thereon, the at least one processor, when the instructions are executed by the at least one processor, acting as:
a first display control unit configured to display, on a screen, a plurality of buttons, wherein each of the plurality of buttons corresponds to a different one of the plurality of functions;
a reordering unit configured to automatically reorder the plurality of buttons;
a second display control unit configured to display a setting screen on which enabling or disabling of the reordering of the plurality of buttons can be set, the reordering being performed by the reordering unit;
a setting unit configured to set the reordering of the plurality of buttons to enabled or disabled based on a setting accepted on the setting screen; and
a storage unit configured to store the setting accepted on the setting screen,
wherein, in a case where the setting unit makes a setting in which the reordering is enabled, the reordering unit performs the reordering of the plurality of buttons, and in a case where the setting unit makes a setting in which the reordering is disabled, the reordering unit does not perform the reordering of the plurality of buttons.

2. The information processing apparatus according to claim 1,
wherein the at least one processor further acts as an authentication unit configured to authenticate a user who operates the information processing apparatus, and
wherein the storage unit is configured to store information indicating the user authenticated by the authentication unit and the setting in association with each other.

3. The information processing apparatus according to claim 1, wherein the storage unit is configured to store the setting as a common apparatus setting of the information processing apparatus.

4. The information processing apparatus according to claim 1, wherein the reordering unit is configured to perform display so that at least one of the plurality of buttons is placed at a top.

5. The information processing apparatus according to claim 1, wherein the reordering unit is configured to automatically reorder the plurality of buttons based on a number of uses of the plurality of buttons.

6. The information processing apparatus according to claim 1,
wherein, in a case where the setting unit sets the reordering to enabled, a number of uses of the plurality of buttons is stored, and
wherein, in a case where the setting unit sets the reordering to disabled, the number of uses of the plurality of buttons is not stored.

7. The information processing apparatus according to claim 1, wherein, in a case where the setting is changed, the first display control unit is configured to present, to a user, a plurality of screen candidates each different in order of the plurality of buttons, and display a screen corresponding to a candidate selected by the user.

8. The information processing apparatus according to claim 7, wherein the plurality of screen candidates includes at least one of a screen on which the plurality of buttons is displayed in default order and a screen on which the plurality of buttons is displayed in order determined based on at least a number of uses of the plurality of buttons.

9. The information processing apparatus according to claim 7, wherein the plurality of screen candidates includes at least a screen on which the plurality of buttons is displayed in order used when the reordering is set to disabled by the setting unit last time.

10. The information processing apparatus according to claim 1, wherein the first display control unit is configured to display a button for displaying a screen before the plurality of buttons is reordered by the reordering unit.

11. The information processing apparatus according to claim 1, wherein the reordering unit is configured to reorder the plurality of buttons based on a plurality of factors including a number of uses of the plurality of buttons.

12. The information processing apparatus according to claim 11, wherein the setting unit is configured to be capable of setting the reordering to enabled or disabled with respect to each of the plurality of factors.

13. The information processing apparatus according to claim 1, wherein the reordering unit is configured to perform display so that a button that is frequently used is placed at a top.

14. A method for an information processing apparatus having a plurality of functions, the method comprising:
performing display control to display, on a screen, a plurality of buttons, wherein each of the plurality of buttons corresponds to a different one of the plurality of functions;

performing reordering to automatically reorder the plurality of buttons;

performing display control to display a setting screen on which enabling or disabling of the reordering of the plurality of buttons can be set;

setting the reordering of the plurality of buttons to enabled or disabled based on a setting accepted on the setting screen; and storing the setting accepted on the setting screen, wherein, in a case where the reordering is set to enabled in the setting, the reordering of the plurality of buttons is performed in the reordering, and in a case where the reordering is set to disabled in the setting, the reordering of the plurality of buttons is not performed in the reordering.

15. A non-transitory computer-readable storage medium storing a program to cause a computer to perform a method for an information processing apparatus having a plurality of functions, the method comprising:

performing display control to display, on a screen, a plurality of buttons, wherein each of the plurality of buttons corresponds to a different one of the plurality of functions;

performing reordering to automatically reorder the plurality of buttons;

performing display control to display a setting screen on which enabling or disabling of the reordering of the plurality of buttons can be set;

setting the reordering of the plurality of buttons to enabled or disabled based on a setting accepted on the setting screen; and storing the setting accepted on the setting screen, wherein, in a case where the reordering is set to enabled in the setting, the reordering of the plurality of buttons is performed in the reordering, and in a case where the reordering is set to disabled in the setting, the reordering of the plurality of buttons is not performed in the reordering.

* * * * *